(12) United States Patent
Thummalapally

(10) Patent No.: US 7,694,069 B2
(45) Date of Patent: Apr. 6, 2010

(54) SYSTEM AND METHOD FOR DETECTING MULTIPLE MATCHES

(75) Inventor: Damodar R. Thummalapally, Milpitas, CA (US)

(73) Assignee: DSM Solutions, Inc., Los Gatos, CA (US)

( * ) Notice: Subject to any disclaimer, the term of this patent is extended or adjusted under 35 U.S.C. 154(b) by 503 days.

(21) Appl. No.: 11/693,441

(22) Filed: Mar. 29, 2007

(65) Prior Publication Data

US 2008/0239779 A1    Oct. 2, 2008

(51) Int. Cl.
*G06F 13/00* (2006.01)
(52) U.S. Cl. .................. 711/108; 711/113
(58) Field of Classification Search ............ 711/108, 711/113, 131, 151; 365/49
See application file for complete search history.

(56) References Cited

U.S. PATENT DOCUMENTS

| | | | | |
|---|---|---|---|---|
| 4,670,858 | A | 6/1987 | Almy | 365/49 |
| 6,718,433 | B1 * | 4/2004 | Pereira | 711/108 |
| 2005/0027931 | A1 | 2/2005 | Joshi | 711/108 |
| 2006/0062037 | A1 * | 3/2006 | Regev et al. | 365/49 |

OTHER PUBLICATIONS

*PCT Notification of Transmittal of the International Search Report and the Written Opinion of the International Searching Authority* for International Application No. PCT/US2008/057986; 12 pages, Sep. 1, 2008.

Kostas Pagiamtzis and Ali Sheikholeslami, "Content-Addressable Memory (CAM) Circuits and Architectures: A Tutorial and Survey," *IEEE Journal of Solid State Circuits*, vol. 41, No. 3, Mar. 2006, pp. 712-727.

Cheong Kun, Shaolei Quan, and Andrew Mason, "A Power-Optimized 64-Bit Priority Encoder Utilizing Parallel Priority Look-Ahead," *Circuits and Systems, ISCAS '04*, Proceedings of the 2004 International Symposium on Circuits and Systems, May 2004, pp. II-753-II-756.

* cited by examiner

*Primary Examiner*—Vu A Le
(74) *Attorney, Agent, or Firm*—Baker Botts L.L.P.

(57) ABSTRACT

A system for identifying asserted signals includes a plurality of input ports, a priority encoding module, and a match module. The plurality of input ports receive one of a plurality of input signals. The priority encoding module is coupled to the plurality of input ports and outputs a signal indicating a highest-priority input signal that is asserted. The match module is also coupled to the plurality of input ports and receives a plurality of match detect signals from the priority encoding module. Each match detect signal is associated with a particular input signal and indicates whether another input signal having a higher-priority than the associated input signal is asserted. The match module also generates a multiple match signal based on the input signals and the match detect signals. The multiple match signal indicates whether more than one of the input signals is asserted.

34 Claims, 7 Drawing Sheets

TO FIG. 3B

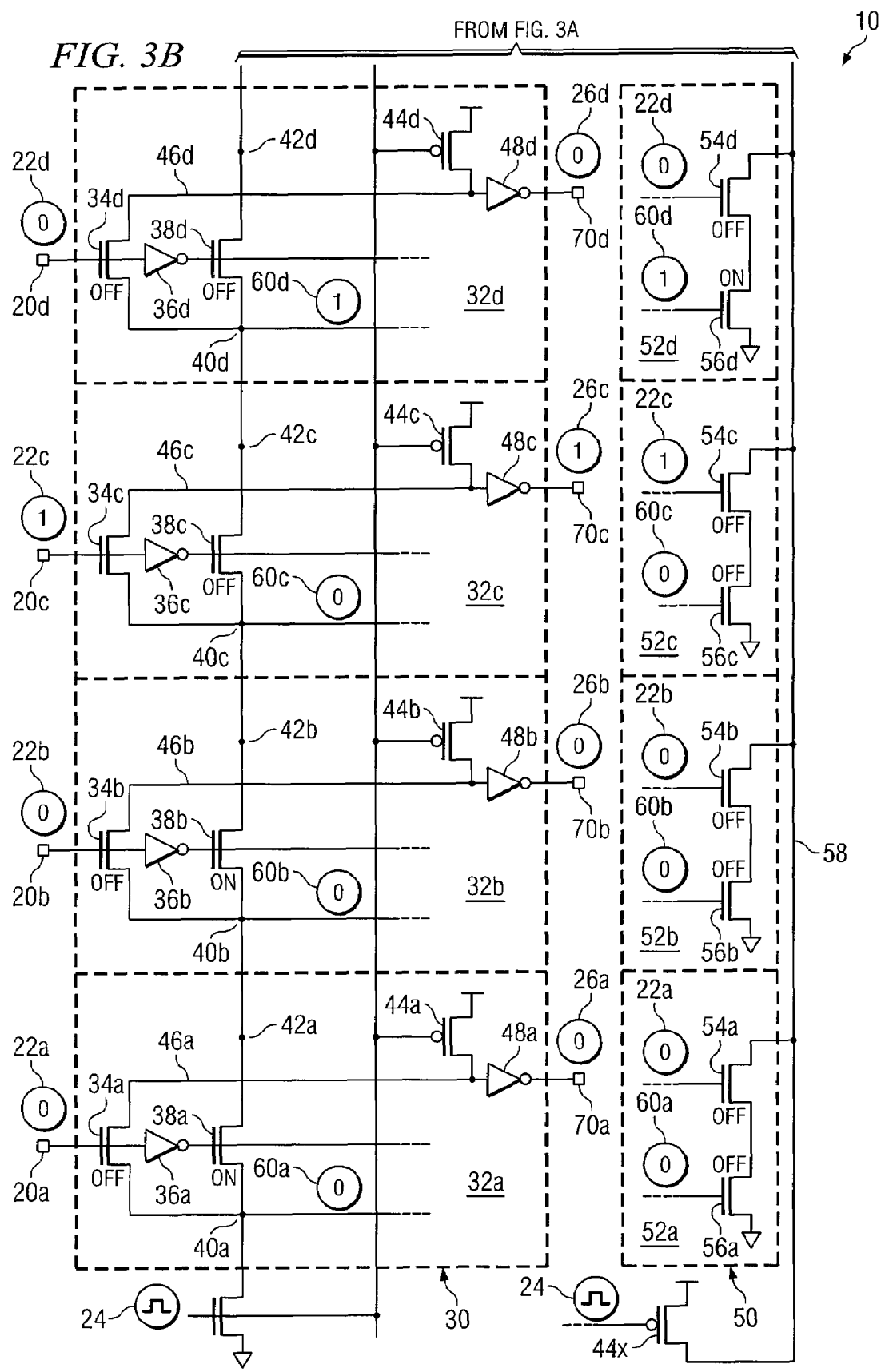

SYSTEM AND METHOD FOR DETECTING MULTIPLE MATCHES

TECHNICAL FIELD OF THE INVENTION

This invention relates, in general, to digital logic circuits and, more particularly, to an apparatus and system for detecting multiple assertions in the inputs to a priority encoder.

BACKGROUND OF THE INVENTION

Priority encoders are used in a variety of different computing components, including fixed- and floating-point processing units, comparators, incrementers, and decrementers. In general, a priority encoder receives a plurality of prioritized input signals, any of which may be asserted. In response to these input signals, the priority encoder generates an equal number of outputs with at most a single output signal asserted. This asserted output signal corresponds to the highest-priority input signal that is asserted. Thus, in essence, the highest-priority asserted input signal passes through the priority encoder while the remaining asserted input signals are cleared.

In many applications, however, the other input signals may carry useful information. For example, in content-addressable memories (CAMs), the fact that more than one input signal is asserted may indicate an error condition exists. As a result, additional circuit stages may need to be added to extract additional information from the received inputs. These additional stages can increase the amount of space and power utilized by the relevant circuits.

SUMMARY OF THE INVENTION

In accordance with the present invention, the disadvantages and problems associated with priority encoder circuits have been substantially reduced or eliminated. In particular, a priority encoding system is provided that is capable of indicating when multiple inputs to the priority encoding system are asserted.

In accordance with one embodiment of the present invention, a system for identifying asserted signals includes a plurality of input ports, a priority encoding module, and a match module. The plurality of input ports are each capable of receiving one of a plurality of input signals. The priority encoding module is coupled to the plurality of input ports and is capable of outputting a signal indicating a highest-priority input signal that is asserted. The match module is also coupled to the plurality of input ports and is capable of receiving a plurality of match detect signals from the priority encoding module. Each match detect signal is associated with a particular input signal and indicates whether another input signal having a higher-priority than the associated input signal is asserted. The match module is also capable of generating a multiple match signal based on the input signals and the match detect signals. The multiple match signal indicates whether more than one of the input signals is asserted.

In accordance with another embodiment of the present invention, an apparatus for detecting asserted input signals includes a plurality of match cells and a multiple match output port. Each match cell is capable of receiving one of a plurality of input signals and a match detect signal associated with the received input signal. The match detect signal indicates whether any other input signal having a higher priority than the received input signal is asserted. Each match cell is additionally capable of generating a multiple match signal based on the received input signal and the received match detect signal. The multiple match signal indicates that more than one of the plurality of prioritized input signals is asserted. Additionally, the multiple match output port is capable of outputting a multiple match signal generated by any of the match cells.

Technical advantages of certain embodiments of the present invention include the ability to identify whether more than one of a set of prioritized inputs is asserted.

Moreover, particular embodiments may provide this functionality using a limited number of components and a limited amount of power. Other technical advantages of the present invention will be readily apparent to one skilled in the art from the following figures, descriptions, and claims. Additionally, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIGS. 2A-2B and 3A-3B show example operation of the system in response to a particular set of input signals.

DETAILED DESCRIPTION OF THE INVENTION

Figure 1A:
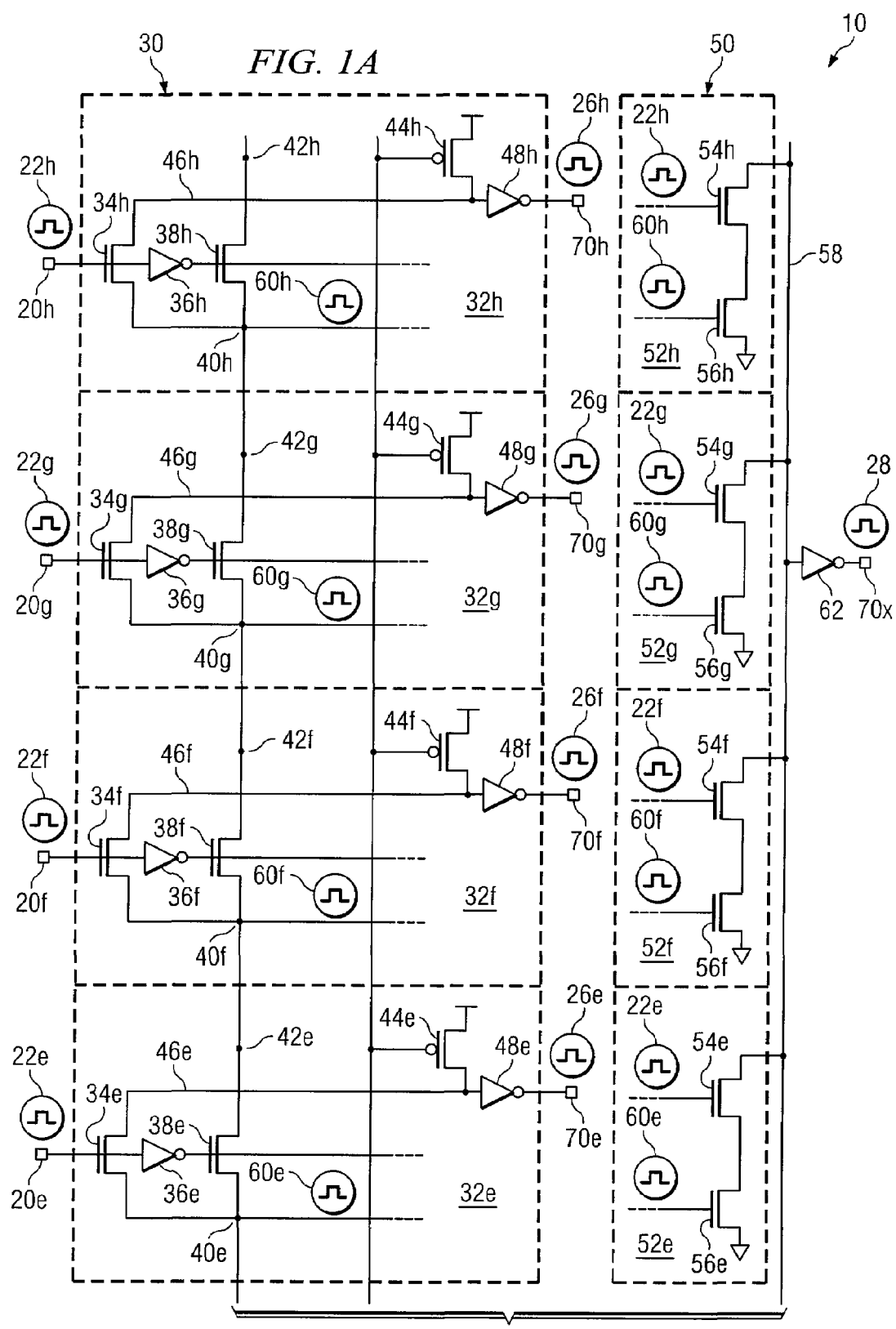
FIGS. 1A-1B illustrate a priority encoding system with multiple-match detection capabilities.
Figure 1B:
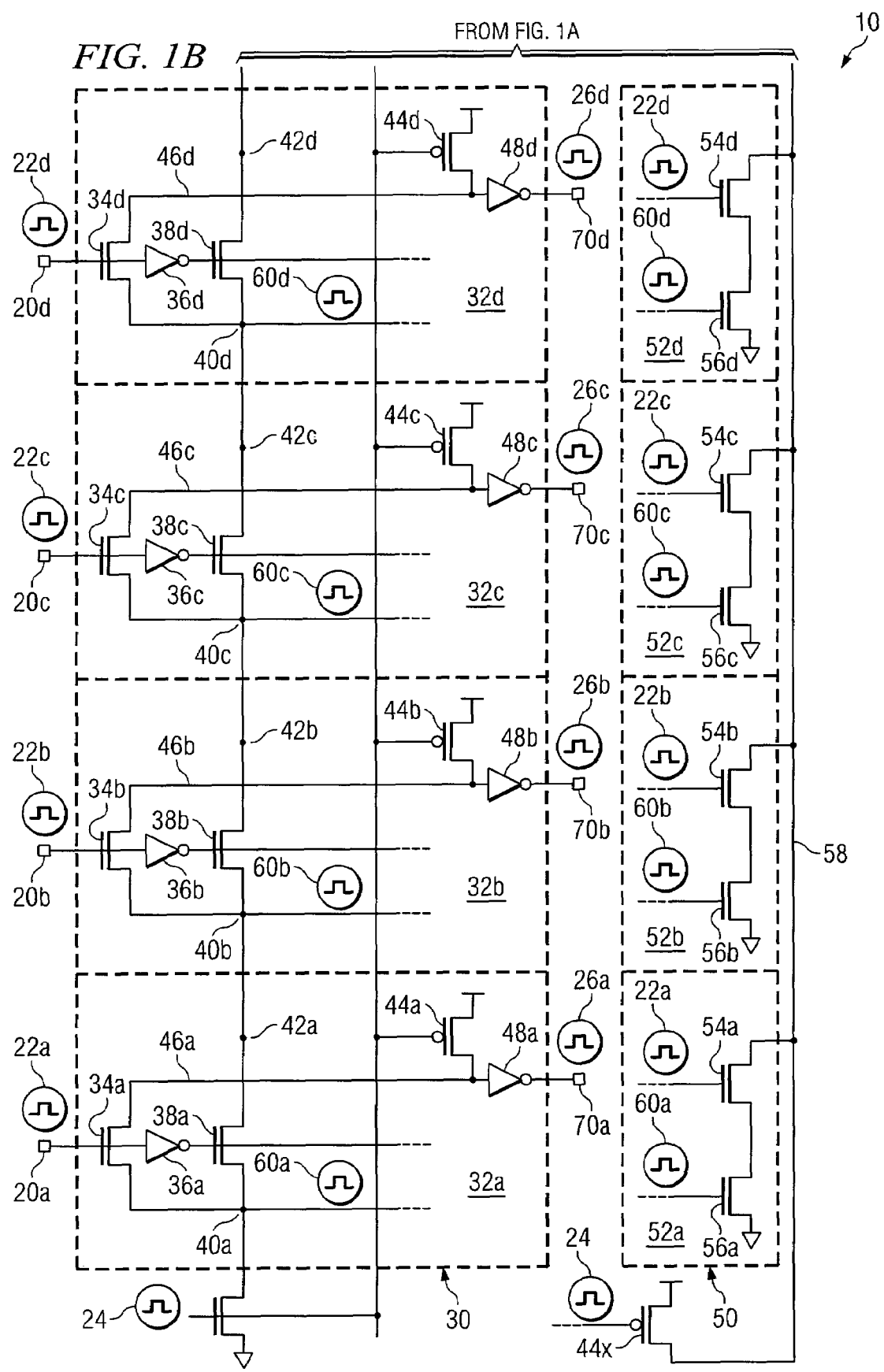

FIGS. 1A and 1B illustrate a priority encoding system 10 for encoding a set of prioritized input signals 22 and determining whether more than one of these input signals 22 is currently asserted. As shown in FIGS. 1A and 1B, priority encoding system 10 includes input ports 20, a priority encoding module 30, and a match module 50. Priority encoding module 30 encodes input signals 22 to generate priority-encoded signals 26, while match module 50 generates a multiple match signal 28 indicating whether multiple input signals 22 are currently asserted. By utilizing intermediate signals generated by priority encoding module 30 to determine whether multiple input signals 22 are asserted, match module 50 may utilize a reduced number of components and limit the power required to provide this functionality.

Input ports 20 receive input signals 22. Priority encoding system 10 may include any appropriate number of input ports 20. In particular embodiments, input signals 22 are assigned a priority, and each input port 20 receives an input signal 22 having a predetermined priority relative to the input signals 22 received by the other input ports 20. In particular embodiments, this priority may represent any appropriate predetermined relationship between input signals 22 by which priority encoding system 10 can select a single input signal 22 to recognize when multiple input signals 22 are asserted. For example, in the illustrated embodiment, this priority is established based on the position of the input port 20 at which a particular input signal 22 is received. In particular, in the illustrated embodiment, priority encoding system 10 includes eight input ports 20a-h that each receive one of eight input signals 22a-h ranked from a highest-priority input signal 22a to a lowest-priority input signal 22h. Although FIGS. 1A and 1B show, for purposes of illustration, a particular embodiment of priority encoding system 10 that encodes eight input signals 22, priority encoding system 10 may be configured to encode any appropriate number of input signals 22.

Priority encoding module 30 receives input signals 22 from input ports 20 and determines the highest-priority input signal 22 that is currently asserted. Priority encoding module 30 then outputs a plurality of priority-encoded signals 26, each associated with a particular input signal 22. As discussed further below, the priority-encoded signal 26 associated with the highest-priority asserted input signal 22 is asserted while the other priority-encoded signals 26 are not asserted.

In the illustrated embodiment of priority encoding system 10, priority encoding module 30 includes a plurality of encoding cells 32, each responsible for processing a particular input signal 22. As shown in FIGS. 1A and 1B, each encoding cell 32 includes an input transistor 34 coupled to a corresponding input port 20; a discharge transistor 38 that, when turned on, forms a path between a match-in node 40 and a match-out node 42 of the encoding cell 32; an encoded output line 46; and a precharge transistor 44 capable of charging encoded output line 46 to a precharge voltage level.

Match module 50 also receives input signals 22 from input ports 20 and then determines whether more than one of input signals 22 is currently asserted. In particular embodiments, match module 50 outputs a multiple match signal 28 that is asserted when more than one of input signals 22 is asserted. In the illustrated embodiment of priority encoding system 10, match module 50 includes a plurality of match cells 52, each responsible for processing a particular input signal 22; a match output line 58; a match module inverter 62; and a precharge transistor 44x. Furthermore, as shown in FIGS. 1A and 1B, each match cell 52 includes a first match transistor 54 and a second match transistor 56 that are capable of forming a path to ground through the relevant match cell 52 when both match transistors 54 and 56 are turned on. As shown in FIGS. 1A and 1B, in particular embodiments of match module 50, the drain of the first match transistor 54 in a particular match cell 52 is coupled to match output line 58 while the source of that first match transistor 54 is coupled to the drain of the second match transistor 56 in that match cell 52. Additionally, in such embodiments, the source of the second match transistor 56 is coupled to ground.

Although FIGS. 1A and 1B illustrate example embodiments of priority encoding module 30 and match module 50 that include certain specific components configured in a particular manner, priority module 30 and match module 50 may each include any collection of components arranged in any configuration suitable to provide the described functionality. Moreover, in particular embodiments, priority encoding module 30 and match module 50 may each comprise a portion of a single integrated circuit, portions of two or more different integrated circuits, and/or a plurality of discrete components.

In addition, although FIGS. 1A and 1B and the description above focus on an embodiment of priority encoding system 10 in which asserted signals have high voltage levels (indicated in FIGS. 2A-2B and 3A-3B with a "1" label) and unasserted signals have low voltage levels (indicated in FIGS. 2A-2B and 3A-3B with a "0" label). Alternative embodiments of priority encoding system 10 may, with appropriate modification, utilize low voltages to represent asserted signals and high voltages to represent unasserted signals. Additionally, these low and high voltage ranges may represent any voltage ranges appropriate based on the characteristics of the various components of priority encoding system 10.

Priority Encoding Module

In operation, at an appropriate time, a precharge signal 24 turns on precharge transistors 44. For example, a clock signal may be applied to precharge transistors 44 that turns on precharge transistors 44 during a charging period of priority encoding system 10. While turned on, precharge transistors 44 form a path from a supply voltage (referred to here as Vcc) to each of encoded output lines 46 and also to match output line 58. As a result, encoded output lines 46 and match output line 58 are precharged to a high voltage level. Precharge transistors 44 may then be turned off, thereby terminating the path to Vcc but doing so without discharging the precharge voltage on encoded output lines 46. For example, at the end of the charging period, the clock signal may transition high, turning off all precharge transistors 44.

After encoded output lines 46 have been precharged, input ports 20 receive a plurality of input signals 22. For example, in particular embodiments, input ports 20 receive match signals from a content-addressable memory (CAM), with each match signal indicating whether a search word received by the CAM matches the contents of a particular word in the CAM. An example of such a CAM system is discussed below with respect to FIG. 4.

As noted above, input signals 22 may be prioritized so that each input signal has a priority relative to the other input signals 22. For example, in the illustrated embodiment, input signals 22 include eight input signals 22 decreasing in priority from the highest-priority input signal $22a$ to the lowest-priority input signal $22h$. In particular embodiments, such as the CAM implementation noted above, the priority of a particular input signal 22 may relate to the memory location associated with that input signal 22. For example, in CAM systems, the priority of input signals 22 may correspond to the address of their associated memory locations with signals associated with lower memory addresses having higher priorities.

Upon receiving input signals 22, priority encoding module 30 identifies the highest-priority input signal 22 that is asserted. Priority encoding module 30 then outputs a set of priority-encoded signals 26. Each of these priority-encoded signal 26 is associated with an input signal 22. Priority encoding module 30 asserts the priority-encoded signal 26 associated with the highest-priority input signal 22 that is asserted. All other priority-encoded signals 26 output by priority encoding module 30 remain unasserted. As a result, only a single priority-encoded signal 26, the one associated with the highest-priority asserted input signal 22, is asserted while all other priority-encoded signals 26 remain unasserted.

More specifically, in the illustrated embodiment, when priority encoding module 30 receives an input signal 22 that is asserted, the asserted input signal 22 turns on an input transistor 34 associated with the input port 20 that received the asserted input signal 22. For example, when input signal $22c$ received by input port $20c$ is asserted and the corresponding match-in node 40 is grounded, input signal $22c$ turns on input transistor $34c$. This causes the relevant input transistor 34 to connect its corresponding encoded output line 46 to its match-in node 40. If that match-in node 40 has been grounded, this will cause the precharge voltage on the associated encoded output line 46 to be discharged. As discussed further below, the voltage on match-in node 40 depends on whether any of the higher priority input signals 22 for a given encoding cell 32 are asserted.

If, however, the received input signal 22 is not asserted, the associated input transistor 34 will be turned off (or, depending on its initial state, will remain turned off) and the associated encoded output line 46 will not be connected to match-in node 40. As a result, the precharge voltage on that encoded output line 46 will not be discharged. For example, when input port $20c$ receives an unasserted input signal $22c$, input transistor $34c$ turns off, thereby disconnecting encoded output line $46c$ from match-in node 40c. Consequently, the precharge voltage on encoded output line 46c is not discharged.

Output inverters 48 then invert the voltage level on encoded output lines 46 to generate priority-encoded signals 26 that are output to output ports 70. If the precharge voltage on a particular encoded output line 46 has been discharged, the associated output inverter 48 will output a priority-encoded signal 26 that is asserted. If, instead, the precharge voltage still remains on that encoded output line 46, then the output inverter 48 outputs an unasserted priority-encoded signal 26. For example, returning to encoded output line 46c, when encoded output line 46c is connected to a grounded match-in node 40c, the precharge voltage on encoded output line 46c is discharged and output inverter 48c outputs an asserted priority-encoded signal 26c. On the other hand, when encoded output line 46c is not connected to match-in node 40c or match-in node 40c is not grounded, the precharge on encoded output line 46c is not discharged and output inverter 48c outputs an unasserted priority-encoded signal 26c.

In addition to being received by input transistors 34, input signals 22 are also received by input inverters 36 and inverted. After being inverted, input signals 22 are then transmitted to discharge transistors 38. As a result, if a particular input signal 22 is asserted, then the corresponding discharge transistor 38 will be turned off. Alternatively, if a particular input signal 22 is not asserted, then the corresponding discharge transistor 38 will be turned on if the corresponding match-in node 42 is currently grounded. For example, discharge transistor 38c will be turned off if input signal 22c is asserted and turned on if input signal 22c is not asserted and match-in node 40c is grounded.

When a particular discharge transistor 38 is turned on, a conducting path is formed between the match-out node 42 and the match-in node 40 associated with that discharge transistor 38. Because, in the illustrated embodiment, discharge transistors 38 form a stack that can connect each successive match-in node 40 to ground, a particular match-in node 40 will be connected to ground only if all of the discharge transistors 38 associated with higher-priority input signals 22 are turned on. In the illustrated embodiment, this will only occur when none of the higher priority input signals 22 are asserted.

As a result, a particular match-in node 40 will be grounded if none of the input signals 22 having a higher priority than the input signal associated with that match-in node 40 are asserted. Thus, in the encoding cell 32 associated with a particular input signal 22, match-in node 40 indicates the state of all input signals 22 having a higher priority than that particular input signal 22. For example, returning again to match-in node 40c in the illustrated embodiment, match-in node 40c will be grounded only if neither of input signals 22a and 22b are asserted.

As discussed above, the priority-encoded signal 26 output by an encoding cell 32 will only be asserted if the input signal 22 received by that encoding cell 32 is asserted and the match-in node 40 is grounded. Consequently, an encoding cell 32 will only output an asserted priority-encoded signal 26 if its received input signal 22 is asserted and no higher priority input signals 22 are also asserted. Thus, the encoding cells 32 collectively output a plurality of priority-encoded signals 26 with at most a single priority-encoded signal 26 asserted. In particular, the one asserted priority-encoded signal 26 is output by the encoding cell 32 that receives the highest-priority asserted input signal 22.

Multiple Match Module

Additionally, because the voltage available at a particular match-in node 40 indicates whether any higher-priority input signal 22 is asserted, this voltage may be useful in detecting a situation where multiple input signals 22 are asserted. In CAM systems, this situation is called a multiple match. Moreover, by utilizing the intermediate signals generated within priority encoding module 30 to detect such multiple match situations, particular embodiments of priority encoding system 10 may be configured to utilize fewer components. This may result in embodiments of priority encoding system 10 that utilize a reduced number of components, require less space, and/or utilize less power.

Therefore, as shown in FIGS. 1A and 1B, match module 50 may couple to match-in nodes 40 of priority encoding module 30 and utilize the voltage of those nodes (referred to here as "match detect signals 60") to detect multiple match situations. For example, in the illustrated example, match module 50 receives a match detect signal 60 from each encoding cell 32. In the illustrated example, match module 50 also couples to input ports 20 (as suggested by the dotted line paths exiting input ports 20 and entering match cells 52) and, as a result, receives input signals 22. By comparing each input signal 22 with its corresponding match detect signal 60, match module 50 can determine whether more than one input signal 22 is currently asserted.

More specifically, each match cell 52 receives the match detect signal 60 from a particular encoding cell 32 and the input signal 22 received by that encoding cell 32. A first match transistor 54 in each match cell 52 receives the input signal 22 while a second match transistor 56 in each match cell 52 receives match detect signal 60. If both the input signal 22 and match detect signal 60 for a particular match cell 52 are asserted, both first match transistor 54 and second match transistor 56 for that match cell 52 will be turned on, creating a path that couples match output line 58 to ground. As a result, the precharge voltage on match output line 58 will be discharged. Alternatively, if either of the input signal 22 and match detect signal 60 for a particular match cell 52 are not asserted, then first match transistor 54 and second match transistor 56 will not both be turned on. As a result, that match cell 52 will not couple match output line 58 to ground and the precharge voltage on match output line 58 will not be discharged.

Match module 50 then outputs a multiple match signal 28 based on the voltage level on match output line 58. In particular, match module inverter 62 inverts the voltage level on match output line 58 to generate multiple match signal 28. If no match cell 52 couples match output line 58 to ground, the precharge voltage remains on match output line 58 and match module inverter 62 generates a multiple match signal 28 that is not asserted. By contrast, if one or more match cells 52 couple match output line 58 to ground, the precharge voltage on match output line 58 is discharged and match module inverter 62 generates a multiple match signal 28 that is asserted. Match module 50 then outputs multiple match signal 28 at multiple match output port 70x.

Thus, multiple match signal 28 will be asserted when both signals received by a particular match cell 52 (i.e., the relevant input signal 22 and match detect signal 60) are asserted. As FIGS. 1A and 1B and the description above illustrate, this situation occurs whenever an encoding cell 32 receives an asserted input signal 22 at the same time as the voltage level at its match-in node 40 indicates that a higher-priority encoding cell 32 also received an asserted input signal 22. Thus, multiple match signal 28 is asserted whenever more than one input signal 22 is asserted. To illustrate, FIGS. 2A-2B and 3A-3B below show example operation of particular embodiments of priority encoding system 10 in responding to specific input signals 22.

Consequently, priority encoding system 10 provides multiple different types of functionality using, in part, a common set of components. For example, as shown, particular embodiments of priority encoding system 10 provide priority encoding as well as multiple match detection. Thus, applications that utilize both of these related functions can be implemented using a priority encoding system 10 that is smaller, costs less, and uses less power. As a result, certain embodiments of priority encoding system 10 may provide multiple benefits. Alternative embodiments, however, may provide some, all, or none of these specific benefits.

Additionally, although FIGS. 1A and 1B illustrate a particular embodiment of priority encoding system 10 that utilizes a particular collection and arrangement of components to provide the described functionality, alternative embodiments of priority encoding system 10 may provide the same functionality using other suitable components and configurations. To illustrate, in particular embodiments, one or more of transistors 34, 38, 44, 54, and 56 may be coupled with a complementary transistor to increase the robustness of priority encoding system 10. For example, one or more of the n-type input transistors 34 may be connected in parallel with a p-type transistor that also couples the encoded output line 46 of the relevant encoding cell 32 to the match-in node 40 of that cell 32, but that receives an inverted version of input signal 22.

Figure 2A:
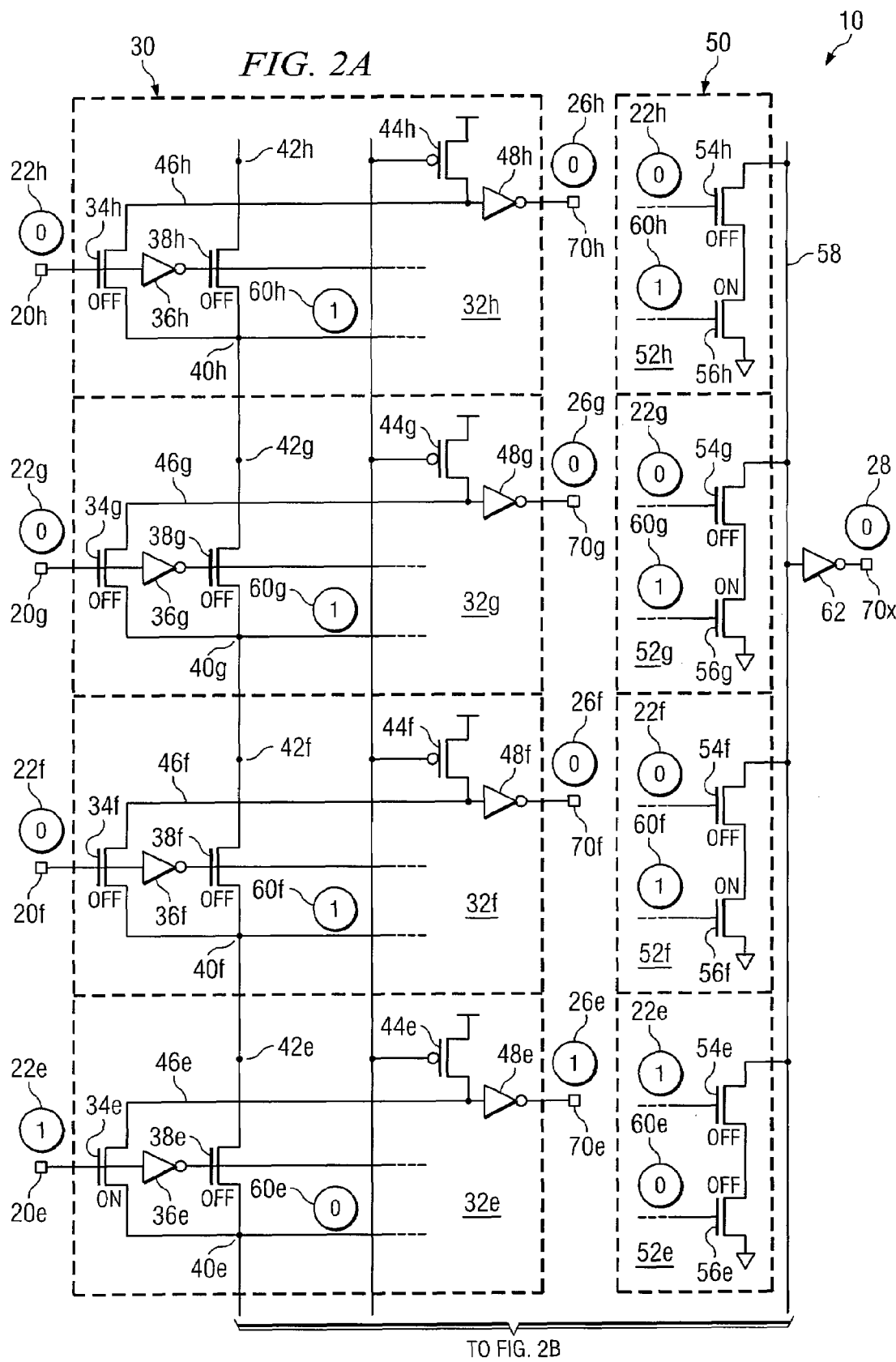
Figure 2B:
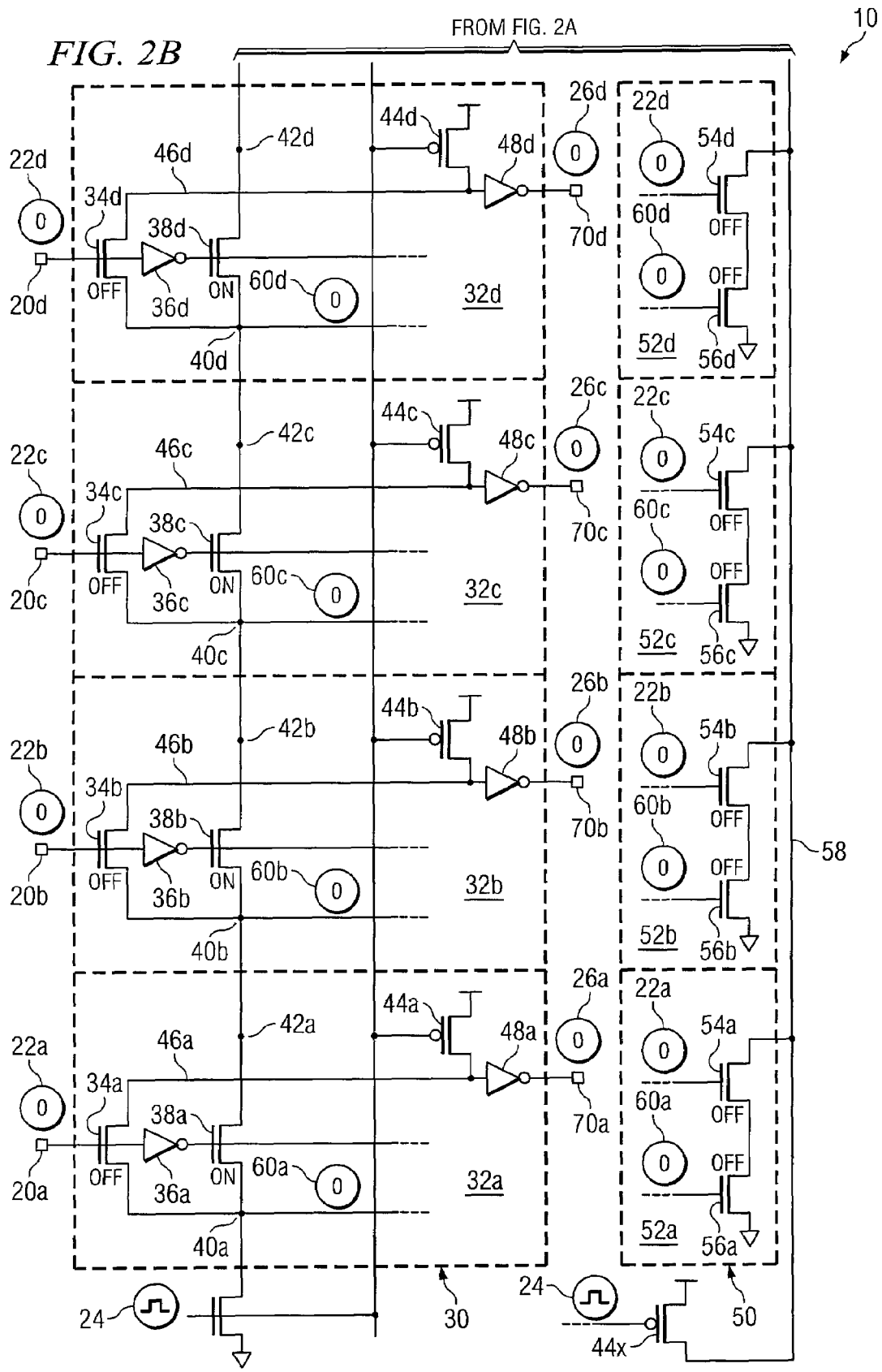
Figure 3A:
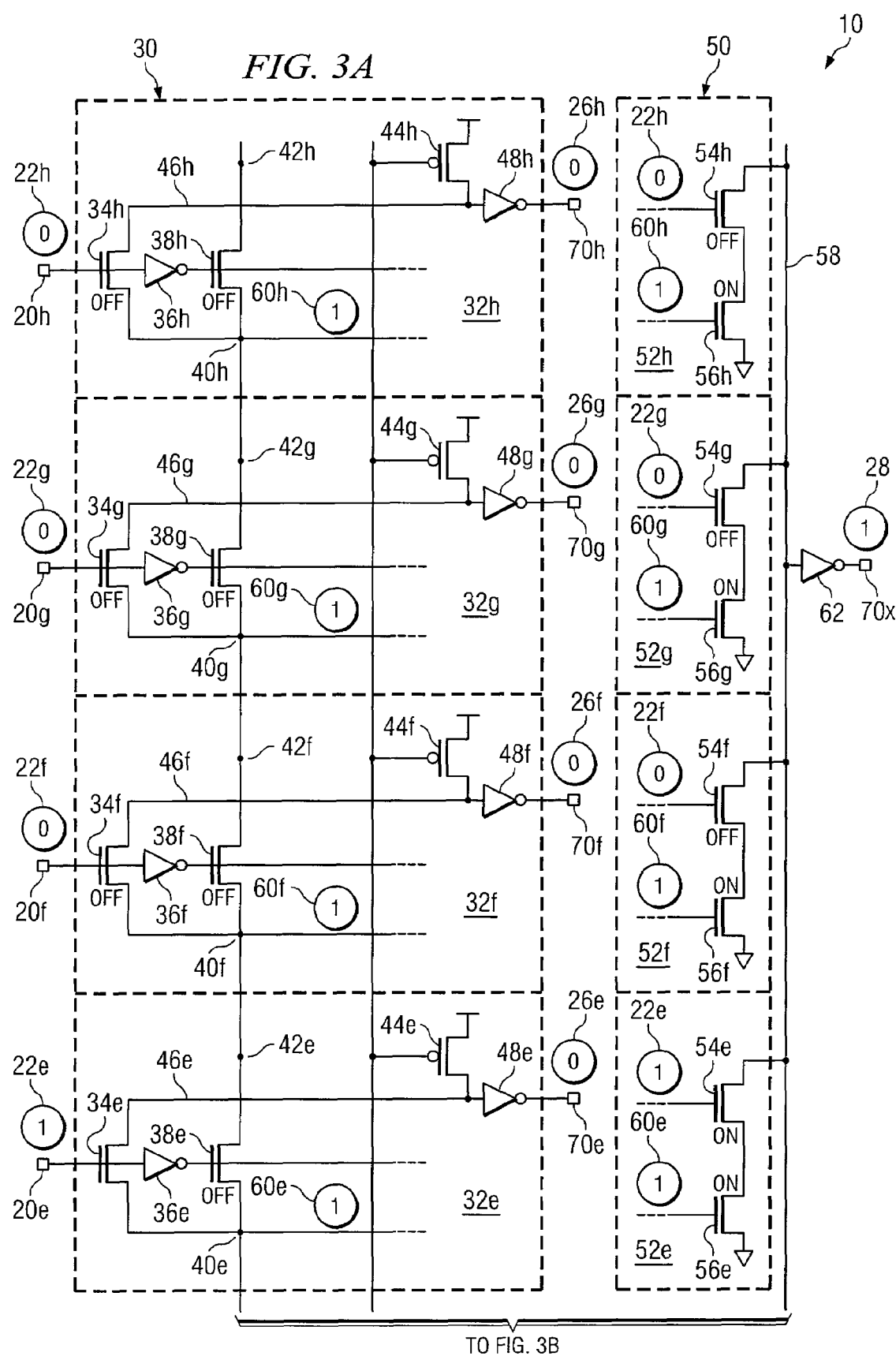

FIGS. 2A-2B and 3A-3B illustrate example operation of a particular embodiment of priority encoding system 10 in responding to specific combinations of input signals 22. In particular, FIGS. 2A and 2B illustrate an example in which only a single input signal 22 is asserted. By contrast, FIGS. 3A and 3B illustrate an example in which multiple input signals 22 are asserted.

More specifically, in the example illustrated by FIGS. 2A and 2B, priority encoding system 10 receives input signals 22*a-h*. Input signals 22*a-d* and 22*f-h* are not asserted (as indicated by the "0" labels), while input signal 22*e* is asserted (as indicated by the "1" label). As a result, each of input transistors 34*a-d* are turned off as shown in FIGS. 2A and 2B, and input transistors 34*a-d* therefore do not form a conducting path connecting encoded output lines 46*a-d* to ground. As a result, the precharge voltage placed on encoded output lines 46*a-d* is not discharged and output inverters 48*a-d* output a low voltage as shown. On the other hand, discharge transistors 38*a-d* are all turned on and, as a result, each of match-in nodes 40*a-d* and match-out nodes 42*a-d* is connected to ground. As a result of match-in nodes 40*a-d* being grounded, match detect signals 60*a-d* are not asserted Turning to match module 50, match cells 52*a-d* receive input signals 22*a-d* and match detect signals 60*a-d*. Because input signals 22*a-d* and match detect signals 60*a-d* are not asserted, first match transistor 54 and second match transistor 56 for each of match cells 52*a-d* are both turned off. Consequently, none of match cells 52*a-d* create a path to ground for match output line 58. Therefore, the precharge voltage on match output line 58 does not discharge as a result of the signals received by match cells 52*a-d*

Returning to priority encoding module 30, because input signal 22*e* is asserted, input transistor 34*e* is turned on. Therefore, encoded output line 46*e* is coupled to match-in node 40*e*. Moreover, because all of discharge transistors 38*a-d* are turned on, match-in node 40*e* connects to ground. Thus, the precharge voltage placed on encoded output line 46*e* is discharged and output inverter 48*e* outputs a high voltage as shown. Additionally, discharge transistor 38*e* receives a low voltage and, thus, is turned off as shown. As a result, match-out node 42*e* (and, therefore, match-in node 40*f*) is not connected to ground and maintains a voltage approximately equal to Vcc.

Match cell 52*e* receives input signal 22*e* and match detect signal 60*e*. Because match-in node 40*e* is grounded, match detect signal 60*e* is not asserted. As a result, second match transistor 56*e* is turned off. Because at least one match transistor in match cell 52*e* is turned off, match cell 52*e* also does not create a path to ground for match output line 58. Therefore, the precharge voltage on match output line 58 also does not discharge as a result of the signals received by match cell 52*e*.

Because input signals 22*f-h* are not asserted, input transistors 34*f-h* are turned off similar to input transistors 34*a-d* and do not couple encoded output lines 46*f-h* to match-in nodes 40*f-h*. As a result, the precharge voltage placed on encoded output lines 46*f-h* is not discharged and output inverters 48*f-h* output a low voltage as shown. Because discharge transistor 38*e* is turned off, match-in nodes 40*f-h* are not connected to ground. Because match-in nodes 40*f-h* do not have a direct path to ground, the voltage of these nodes is maintained at a voltage approximately equal to Vcc, within the range of asserted logic signals in priority encoding system 10. As a result, match detect signals 60*f-h* are asserted.

Match cells 52*f-h* receive input signals 22*f-h* and match detect signals 60*f-h*. Because match detect signals 60*f-h* are asserted, second match transistors 56*f-h* are turned on. Because input signals 22*f-h* are not asserted, however, first match transistors 54*f-h* are turned off. As a result, match cells 52*f-h* also do not create a path to ground for match output line 58. Therefore, the precharge voltage on match output line 58 also does not discharge as a result of the signals received by match cells 52*f-h*.

Thus, overall, priority encoding module 30 outputs a plurality of priority-encoded signals 26*a-h* with only priority-encoded signal 26*e* asserted. Furthermore, none of match cells 52*a-h* creates a path to ground for match output line 58. As a result, the precharge voltage is not discharged by any of match cells 52. Consequently, match module inverter 62 outputs a multiple match signal 28 that is not asserted, indicating that no more than one input signal 22 is currently asserted.

By contrast, in the example illustrated by FIGS. 3A and 3B, priority encoding system 10 receives the input signals 22*a-h* as shown. Input signals 22*a*, 22*b*, 22*d*, and 22*f-h* are not asserted (as indicated by the "0" labels), while input signals 22*c* and 22*e* are asserted (as indicated by the "1" labels). As a result, both of input transistors 34*a* and 34*b* are turned off as shown in FIGS. 3A and 3B. Input transistors 34*a* and 34*b* therefore do not create a conducting path connecting encoded output lines 46*a* and 46*b* to match-in nodes 40*a* and 40*b*. As a result, the precharge voltage placed on encoded output lines 46*a* and 46*b* is not discharged and output inverters 48*a* and 48*b* output a low voltage as shown. On the other hand, discharge transistors 38*a* and 38*b* are both turned on, and each of match-in nodes 40*a* and 40*b* and match-out nodes 42*a* and 42*b* is connected to ground.

Turning to match module 50, match cells 52*a* and 52*b* receive input signals 22*a* and 22*b* and match detect signals 60*a* and 60*b*, respectively. Because input signals 22*a* and 22*b* are not asserted and match-in nodes 40*a* and 40*b* are grounded, first match transistors 54*a* and 54*b* and second match transistors 56*a* and 56*b*, respectively, are turned off. Consequently, neither match cell 52*a* nor match cell 52*b* creates a path to ground for match output line 58. Therefore, the precharge voltage on match output line also does not discharge as a result of the signals received by match cells 52*a* and 52*b*.

Returning to priority encoding module 30, because input signal 22c is asserted, input transistor 34c is turned on. Therefore, encoded output line 46c is connected to match-in node 40c. Moreover, because discharge transistors 38a and 38b are turned on, match-in node 40c connects to ground. As a result, match detect signal 60c is not asserted. Additionally, the precharge voltage placed on encoded output line 46c is discharged and output inverter 48c outputs a high voltage as shown. Additionally, discharge transistor 38c receives a low voltage as shown and, as a result, is turned off. Consequently, match-out node 42c (and, therefore, match-in node 40d) is not connected to ground.

Match cell 52c receives input signal 22c and match detect signal 60c. Because match detect signal 60c is not asserted, second match transistor 56c is turned off. Moreover, because at least one of match transistors 54c and 56c are turned off, match cell 52c also does not create a path to ground for match output line 58. The precharge voltage on match output line 58 therefore does not discharge as a result of the signals received by match cell 52c.

Because input signal 22d is not asserted, input transistor 34d is turned off and does not couple encoded output line 46d to match-in node 40d. As a result, the precharge voltage placed on encoded output line 46d is not discharged and output inverter 48d outputs a low voltage as shown. Because discharge transistor 38c is turned off, match-in node 40d is not connected to ground. Because match-in node 40d does not have a direct path to ground, the voltage of this node is left near Vcc, within the range of asserted logic signals in priority encoding system 10. As a result, match detect signal 60d is asserted.

Match cell 52d receives input signal 22d and match detect signal 60d. Because match detect signal 60d is asserted, second match transistor 56d is turned on. Nonetheless, because input signal 22d is not asserted, first match transistor 54d is turned off. As a result, match cell 52d also does not create a path to ground for match output line 58. Therefore, the precharge voltage on match output line 58 does not discharge as a result of the signals received by match cell 52d.

Returning again to priority encoding module 30, because discharge transistors 38c and 38d are turned off, the voltage of match-in node 40e is left near Vcc. As a result, input transistor 34e does not turn on despite the fact that input signal 22e is asserted. As a result, the precharge voltage placed on encoded output line 46e is not discharged and output inverter 48e outputs a low voltage as shown. Discharge transistor 38e receives a low voltage as shown and thus is also turned off. Because of the high voltage on match-in node 40e, match detect signal 60e is asserted.

Match cell 52e receives input signal 22e and match detect signal 60e. Because both input signal 22e and match detect signal 60e are asserted, both first match transistor 54e and second match transistor 56e are turned on. Consequently, match cell 52e provides a path to ground for match output line 58. As a result, the precharge voltage on match output line 58 discharges through match cell 52d, and match module inverter 62 asserts multiple match signal 28.

Encoding cells 32f-h and match cells 52f-h in this example operate similar to encoding cells 32f-h and match cells 52f-h, respectively, from the example of FIGS. 1A and 1B. As a result, priority-encoded signals 26f-h are not asserted. Moreover, match cells 52f-h do not provide a path to ground for match output line 58.

Overall, however, because both input signal 22e and match detect signal 60e are asserted in this example, match cell 52e grounds match output line 58 and causes match module 50 to output an asserted multiple match signal 28. Thus, in this example, priority encoding system 10 not only outputs priority-encoded signals 26, but also provides an output indicating that multiple input signals 22 are asserted.

Figure 4:
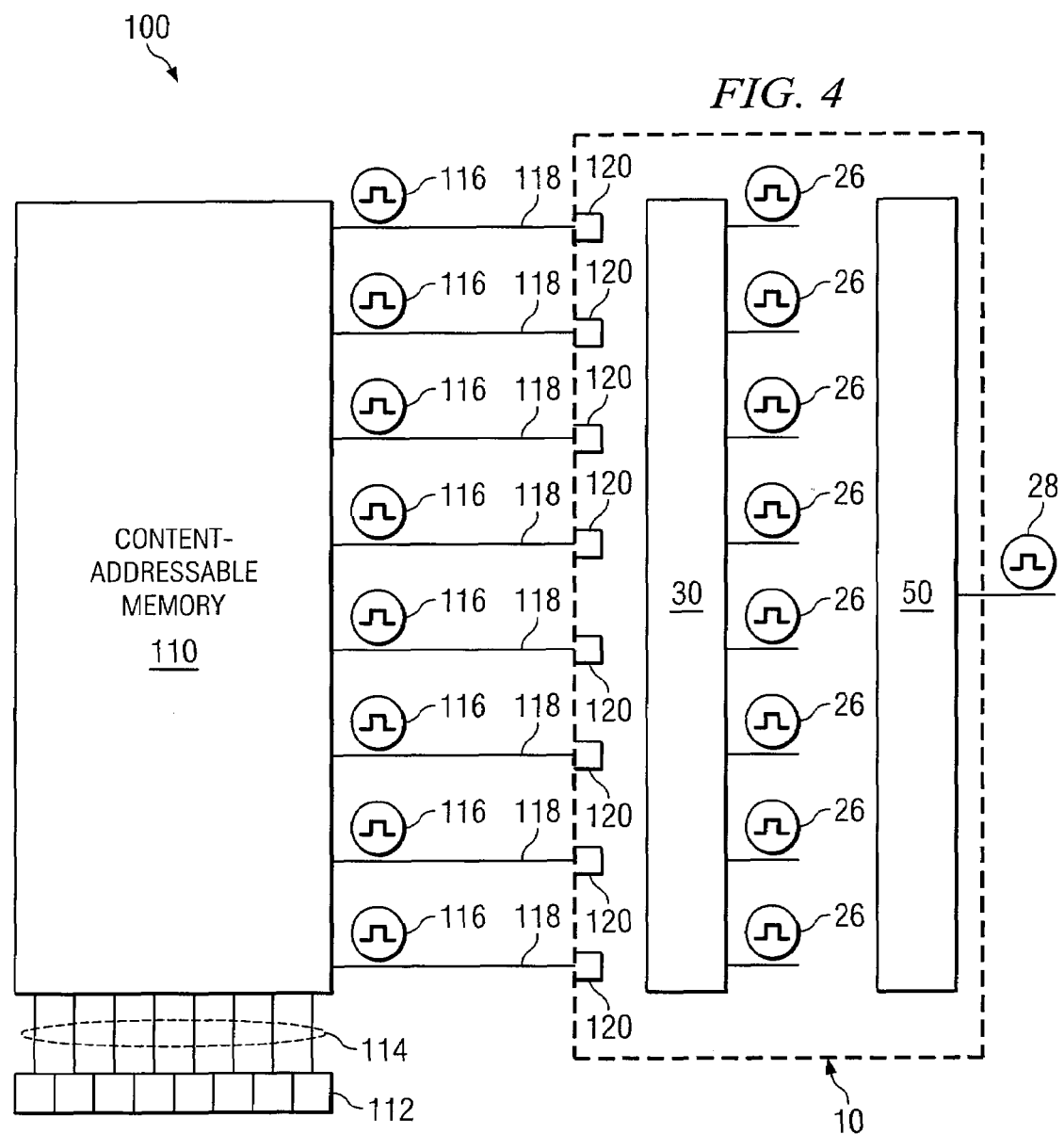
FIG. 4 illustrates a content-addressable memory system in which the priority encoding system described by FIGS. 1A-1B may be utilized.

FIG. 4 illustrates an example application for particular embodiments of priority encoding system 10. In particular, FIG. 4 illustrates a CAM system 100 in which a particular embodiment of priority encoding system 10 may be utilized. As shown in FIG. 4, CAM system 100 includes a content-addressable memory 110 that receives search words 112 on a plurality of searchlines 114 and transmits match signals 116 to input ports 20 of priority encoding system 10 through a plurality of matchlines 118. As a result, CAM system 100 is capable of finding a stored copy of a received search word 112 in content-addressable memory 110 and generating a set of priority-encoded signals 26 that indicate the memory location of one stored copy of search word 112.

Content-addressable memory 110 may represent or include any appropriate form of memory device or devices capable of searching their contents for a received search word 112 and returning the locations of stored copies of the received search word 112. Moreover, content-addressable memory 110 may comprise any appropriate form of volatile or non-volatile storage media including magnetic storage devices, optical storage devices, or any other suitable data storage devices.

In operation, content-addressable memory 110 receives a search word 112 on searchlines 114. Search word 112 comprises any appropriately-sized data word. Content-addressable memory 110 compares search word 112 to all data words stored in content-addressable memory 110. Content-addressable memory 110 then outputs a plurality of match signals 116 on matchlines 118. Each match signal 116 indicates whether a memory location associated with the relevant matchline 118 stores a copy of search word 112.

As a result, priority encoding system 10 receives match signals 116 from content-addressable memory 110 at input ports 20. As described above with respect to FIGS. 1A-1B, 2A-2B, and 3A-3B, priority encoding module of priority encoding system 10 encodes match signals 116 by generating a plurality of priority-encoded signals 26. Another component of CAM system 100 may then decode priority-encoded signals 26 to identify a storage location that stores a copy of search word 112 and retrieve the search word 112 from content-addressable memory 110 or to access related information from a second memory device by mapping the priority-encoded signals 26 to the address space of the second memory device. Consequently, CAM system 100 may provide a fast, efficient manner of retrieving a stored search word 112 or information related to the search word 112 and may thus be useful in a number of applications. Furthermore, priority encoding of the match signals 116 may result in straightforward, predictable processing when multiple matches occur.

Nonetheless, for certain applications, a search word 112 should only be stored in a single location within content-addressable memory 110. As a result, multiple matches may suggest that the data in content-addressable memory 110 has been corrupted or another type of error has occurred. Thus, by detecting multiple matches, match module 50 may identify situations in which error-correction, fault-recovery, or other remedial measures should be taken. Furthermore, as noted above, because match module 50 utilizes signals already generated by priority encoding module 30, particular embodiments of match module 50 may utilize a reduced number of components, require less space, and/or utilize less power than multiple match detection performed in another manner. As a result, priority encoding system 10 may provide a number of benefits when included in CAM system 100.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for detecting asserted input signals, comprising:
  a plurality of input ports each operable to receive one of a plurality of input signals;
  a priority encoding module coupled to the plurality of input ports and operable to output a signal indicating a highest priority input signal that is asserted; and
  a match module coupled to the plurality of input ports and operable to:
    receive a plurality of match detect signals from the priority encoding module, wherein each of the match detect signals is associated with a particular input signal and indicates whether another input signal having a higher-priority than the associated input signal is asserted; and
    output a multiple match signal based on the input signals and the match detect signals, wherein the multiple match signal indicates whether more than one of the input signals is asserted.

2. The system of claim 1, wherein the match module comprises:
  a match output port;
  a match output line coupled to the match output port;
  a precharge transistor operable to charge the match output line to a precharge voltage; and
  a plurality of match cells, each operable to:
    receive an input signal from an associated input port;
    receive, from the priority encoding module, a match detect signal associated with the received input signal, wherein the match detect signal indicates whether any other input signal having a higher priority than the received input signal is asserted; and
    discharge the match output line in response to determining that both the input signal and the match detect signal received by the match cell are asserted.

3. The system of claim 2, wherein each of the plurality of match cells comprises:
  a first transistor operable to turn on when the input signal received by that match cell is asserted; and
  a second transistor operable to turn on when the match detect signal received by that match cell is asserted, and wherein each of the plurality of match cells is operable to discharge the match output line when the first transistor of that match cell and the second transistor of that match cell are both turned on.

4. The system of claim 3, wherein, within each match cell:
  a drain of the first transistor is coupled to the match output line;
  a source of the first transistor is coupled to a drain of the second transistor;
  a gate of the first transistor is coupled to an input signal received by that match cell;
  the drain of the second transistor is coupled to the source of the first transistor;
  a source of the second transistor is coupled to ground; and
  a gate of the second transistor is coupled to the match detect signal received by that match cell.

5. The system of claim 4, wherein:
  the first transistor of each match cell is operable to turn on when the input signal received by that match cell is asserted;
  the second transistor of each match cell is operable to turn on when the match detect signal received by that match cell is asserted;
  the first transistor and the second transistor of each match cell are operable to couple the match output line to ground when both are turned on; and
  the match output line remains charged to a precharge voltage if at least one of the first transistor and the second transistor in each of the match cells is turned off.

6. The system of claim 5, wherein:
  the match output line is further coupled to a drain of a precharge transistor;
  a source of the precharge transistor is coupled to a supply voltage terminal operable to provide a high supply voltage;
  a gate of the precharge transistor is coupled to a precharge signal; and
  wherein the precharge transistor is operable to:
    turn on when the precharge signal is at a low voltage level; and
    turn off when the precharge signal is at a high voltage level.

7. The system of claim 5, wherein:
  the match output line is further coupled to a drain of a precharge transistor;
  a source of the precharge transistor is coupled to a supply voltage terminal operable to provide a high supply voltage;
  a gate of the precharge transistor is coupled to a precharge signal; and
  wherein the precharge transistor is operable to:
    turn on when the precharge signal is asserted; and
    turn off when the precharge signal is not asserted.

8. The system of claim 7, further comprising a match module inverter coupled to the drain of the precharge transistor by the match output line, the match module inverter operable to output the multiple match signal to the match output port, wherein:
  the match module inverter outputs a high-voltage multiple match signal when a voltage of the match output line is low; and
  the match module inverter outputs a low-voltage multiple match signal when the voltage of the match output line is high.

9. The system of claim 7, wherein:
  the first transistor and the second transistor each comprise n-type metal-oxide-silicon (MOS) transistor devices; and
  the precharge transistor comprises a p-type MOS transistor device.

10. The system of claim 1, further comprising a memory device operable to transmit the input signals to the input ports.

11. The system of claim 10, wherein each of the input signals indicates whether a particular location in the memory device matches a particular memory word received by the memory device.

12. An apparatus for detecting asserted input signals, comprising:
  a plurality of match cells, each match cell operable to:
    receive one of a plurality of prioritized input signals;
    receive a match detect signal associated with the received input signal, wherein the match detect signal indicates whether any other input signal having a higher priority than the received input signal is asserted; and generate a multiple match signal indicating that more than one of the plurality of prioritized input signals is asserted based on the received input signal and the received match detect signal; and a match output port operable to output a multiple match signal generated by any of the match cells.

13. The apparatus of claim 12, wherein the apparatus further comprises:

a match output line coupled to the match output port; and a precharge transistor operable to charge the match output line to a precharge voltage, and wherein each of the match cells is operable to generate the multiple match signal by discharging the match output line in response to determining that an input signal received by the match cell and an associated match detect signal are both asserted.

14. The apparatus of claim 12, wherein each of the match cells comprises:

a first transistor operable to turn on when the input signal received by that match cell is asserted; and a second transistor operable to turn on when the match detect signal received by that match cell is asserted, and wherein each of the plurality of match cells is operable to generate the multiple match signal when the first transistor of that match cell and the second transistor of that match cell are both turned on.

15. The apparatus of claim 14, further comprising a match output line coupled to the match output port, and wherein the first transistor and second transistor of each match cell are coupled together so that:

a drain of the first transistor is coupled to the match output line;

a source of the first transistor is coupled to a drain of the second transistor;

a gate of the first transistor is coupled to an input signal received by that match cell;

the drain of the second transistor is coupled to the source of the first transistor;

a source of the second transistor is coupled to ground; and a gate of the second transistor is coupled to the match detect signal received by that match cell.

16. The apparatus of claim 15, wherein:

the first transistor of each match cell is operable to turn on when the input signal received by that match cell is asserted;

the second transistor of each match cell is operable to turn on when the match detect signal received by that match cell is asserted;

the first transistor and the second transistor of each match cell are operable to couple the match output line to ground when both are turned on; and the match output line remains charged to a precharge voltage if at least one of the first transistor and the second transistor in each of the match cells is turned off.

17. The apparatus of claim 16, wherein:

the match output line is further coupled to a drain of a precharge transistor;

a source of the precharge transistor is coupled to a supply voltage terminal operable to provide a high supply voltage;

a gate of the precharge transistor is coupled to a precharge signal; and wherein the precharge transistor is operable to:
turn on when the precharge signal is at a low voltage level; and
turn off when the precharge signal is at a high voltage level.

18. The apparatus of claim 16, wherein:

the match output line is further coupled to a drain of a precharge transistor;

a source of the precharge transistor is coupled to a supply voltage terminal operable to provide a high supply voltage;

a gate of the precharge transistor is coupled to a precharge signal; and wherein the precharge transistor is operable to:
turn on when the precharge signal is asserted; and
turn off when the precharge signal is not asserted.

19. The apparatus of claim 18, further comprising a match module inverter coupled to the drain of the precharge transistor by the match output line, the match module inverter operable to output the multiple match signal to the match output port, wherein:

the match module inverter outputs a high-voltage multiple match signal when a voltage of the match output line is low; and the match module inverter outputs a low-voltage multiple match signal when the voltage of the match output line is high.

20. The apparatus of claim 18, wherein:

the first transistor and the second transistor each comprise n-type metal-oxide-silicon (MOS) transistor devices; and the precharge transistor comprises a p-type MOS transistor device.

21. The apparatus of claim 12, wherein the match cells are operable to receive the plurality of prioritized input signals from a memory device.

22. The apparatus of claim 21, wherein each of the prioritized input signals indicates whether a particular location in the memory device matches a particular memory word received by the memory device.

23. A system for detecting asserted input signals, comprising:

a plurality of input signal receiving means;

priority encoding means for outputting a signal indicating a highest-priority input signal that is asserted; and means for receiving a plurality of match detect signals from the priority encoding means, wherein each of the match detect signals is associated with a particular input signal and indicates whether another input signal having a higher-priority than the associated input signal is asserted; and means for generating a multiple match signal based on the input signals and the match detect signals, wherein the multiple match signal indicates whether more than one of the input signals is asserted.

24. The system of claim 23, further comprising:

a multiple match signal output means;

a match output line coupled to the multiple match signal output means;

a precharging means for charging the match output line to a precharge voltage; and a plurality of matching means, each matching means comprising:

means for receiving an input signal from one of the input signal receiving means;

means for receiving, from the priority encoding means, a match detect signal associated with the received input signal, wherein the match detect signal indicates whether any other input signal having a higher priority than the received input signal is asserted; and means for discharging the match output line in response to determining that both the input signal and the match detect signal received by the matching means are asserted.

25. The system of claim 23, wherein the means for discharging further comprises:

a first switching means operable to turn on when a received input signal is asserted; and a second switching means operable to turn on when a match detect signal is asserted, and wherein each of the plurality of matching means is operable to generate the multiple match signal when the first switching means of that match cell and the second switching means of that match cell are both turned on.

26. The system of claim 25, wherein the first switching means and the second switching means of each matching means are coupled together so that:

a first terminal of the first switching means is coupled to the match output line;

a second terminal of the first switching means is coupled to a first terminal of the second switching means;

a third terminal of the first switching means is coupled to an input signal received by that matching means;

the first terminal of the second switching means is coupled to the second terminal of the first switching means;

a second terminal of the second switching means is coupled to ground; and a third terminal of the second switching means is coupled to the match detect signal received by that matching means.

27. The system of claim 26, wherein:

the first switching means comprises means for turning on when the input signal is asserted; and the second switching means comprises means for turning on when the match detect signals is asserted; and wherein;

if both the first switching means and the second switching means of any matching means are turned on, the first switching means and the second switching means couple the match output line to ground; and the match output line remains charged to a precharge voltage if at least one of the first switching means and the second switching means in each of the matching means is turned off.

28. The system of claim 27, wherein:

the match output line is further coupled to a first terminal of a precharging means;

a second terminal of the precharging means is coupled to a voltage supply means operable to apply a high voltage level to the second terminal of the precharging means;

a third terminal of the precharging means is coupled to a precharge signal; and wherein the precharging means comprises means for coupling the match output line to the supply voltage when the precharge signal is asserted.

29. The system of claim 28, further comprising inverting means coupled to the second terminal of the precharging means by the match output line, the inverting means operable to output the multiple match signal, wherein the inverting means comprises:

means for outputting a high-voltage multiple match signal when a voltage of the match output line is low; and means for outputting a low-voltage multiple match signal when the voltage of the match output line is high.

30. The system of claim 28, wherein:

the first switching means and the second switching means each comprise n-type metal-oxide-silicon (MOS) transistor devices; and the precharging means comprises a p-type MOS transistor device.

31. The system of claim 23, further comprising storage means operable to transmit the input signals to the plurality of input signal receiving means.

32. The system of claim 31, wherein each of the input signals indicates whether a particular location in the storage means matches a particular memory word received by the storage means.

33. A system for detecting asserted input signals, comprising:

a memory device operable to:
  receive a search word; and
  generate a plurality of input signals wherein each of the plurality of input signals is assigned a priority and indicates whether data stored in a memory location associated with that input signal matches the search word;

a priority encoder operable to:
  receive the input signals;
  transmit a plurality of match detect signals to a match module, wherein each of the match detect signals is associated with one of the input signals and indicates whether any input signals having a higher priority than the associated input signal are asserted; and
  output a plurality of priority-encoded signals, wherein a priority-encoded signal associated with a highest-priority asserted input signal is asserted; and a match module comprising:
  a match output line;
  a precharge transistor operable to charge the match output line to a precharge voltage;
  a plurality of match cells each operable to receive one of the input signals and an associated match detect signal and each comprising:
    a first transistor operable to turn on when the received input signal is asserted; and
    a second transistor operable to turn on when the received match detect signal is asserted, and wherein each match cell is further operable to discharge the precharge voltage from the match output line when both the first transistor and the second transistor of that match cell are turned on; and
  a match output port coupled to the match output line and operable to transmit a multiple match signal indicating that more than one input signal is asserted if any of the match cells discharge the precharge voltage from the match output line.

34. The system of claim 33, wherein the first transistor and the second transistor in each match cell comprise n-type metal-oxide-semiconductor field-effect transistors (MOSFETs).

* * * * *